US008341288B2

(12) United States Patent
Davie et al.

(10) Patent No.: US 8,341,288 B2
(45) Date of Patent: Dec. 25, 2012

(54) MECHANISM FOR SHARING RESOURCES AMONG DIFFERENT SENDERS AND RECEIVERS

(75) Inventors: Bruce S. Davie, Cambridge, MA (US); Subhasri Dhesikan, San Jose, CA (US); Michael V. DiBiasio, Westford, MA (US); William Foster, Nanaimo (CA); David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 1796 days.

(21) Appl. No.: 10/972,318

(22) Filed: Oct. 22, 2004

(65) Prior Publication Data

US 2006/0089988 A1 Apr. 27, 2006

(51) Int. Cl.
*G06F 15/173* (2006.01)
(52) U.S. Cl. .......................... 709/238; 709/225
(58) Field of Classification Search ................... 709/238
See application file for complete search history.

(56) References Cited

U.S. PATENT DOCUMENTS

| 6,304,576 | B1 |   | 10/2001 | Corley et al. |
| 6,513,108 | B1 |   | 1/2003  | Kerr et al. |
| 6,598,077 | B2 | * | 7/2003  | Primak et al. ................. 709/219 |
| 6,628,649 | B1 |   | 9/2003  | Raj et al. |
| 6,775,231 | B1 |   | 8/2004  | Baker et al. |
| 6,788,646 | B1 | * | 9/2004  | Fodor et al. ................... 370/230 |
| 6,856,601 | B1 |   | 2/2005  | Bell et al. |
| 7,013,338 | B1 | * | 3/2006  | Nag et al. ...................... 709/226 |
| 7,106,756 | B1 | * | 9/2006  | Donovan et al. .............. 370/468 |

OTHER PUBLICATIONS

Ed R. Braden Resource Reservation Protocol (RSVP), RFC 2205, ETF, http://www.ietf.org, Sep. 1997, 105 pages.*
U.S. Appl. No. 09/871,108, Davie.
U.S. Appl. No. 10/039,088, Dibiasio et al.
Session Initiation Protocol, RFC 2543, IETF, http://www.ietf.org, Mar. 1999.
Resource ReSerVation Protocol (RSVP), RFC 2205, IETF, http://www.ietf.org, Sep. 1997.
General Characterization Parameters for Integrated Service Network Elements, RFC 2215, IETF, http://www.ietf.org, Sep. 1997.

* cited by examiner

*Primary Examiner* — Sulaiman Nooristany

(57) ABSTRACT

A technique enables resources to be shared among data flows that may have different senders (sources) and/or different receivers (destinations) in a data network. Identifiers are associated with data flows and used to indicate whether resources may be shared between data flows. The identifiers are carried in signaling messages used to reserve resources for data flows. An existing data flow that is associated with an identifier that matches an identifier associated with a new data flow is allowed to share resources its resources with the new data flow.

29 Claims, 12 Drawing Sheets

| LENGTH 720 | CLASS 730 | TYPE 740 |
|---|---|---|
| GID SET 770 |||

| FLOW ID | SENDER ADDRESS | SENDER PORT | RECEIVER ADDRESS | RECEIVER PORT | RESOURCE ALLOCATION | GID SET |
|---|---|---|---|---|---|---|
| T1 | 123.100.106.149 | 551 | 111.132.141.122 | 771 | 700 | X |
| T2 | 123.100.106.149 | 552 | 111.132.141.122 | 772 | --- | X,Z |
| T3 | 123.100.106.149 | 553 | 111.132.141.122 | 773 | 300 | Z |
| T4 | 123.100.106.149 | 552 | 111.132.141.122 | 774 | --- | Z |

FIG. 8

| ENTRY | RESOURCE ALLOCATION | COMMON GID | SERVING FLOWS |
|---|---|---|---|
| 1 | 700 | X | T1, T2 |
| 2 | 300 | Z | T3, T4 |

FIG. 9

MECHANISM FOR SHARING RESOURCES AMONG DIFFERENT SENDERS AND RECEIVERS

CROSS-REFERENCE TO RELATED APPLICATIONS

The present invention is cross-related to U.S. patent application Ser. No. 09/871,108 titled "System For Sharing Resources Among RSVP Sessions" which was filed on May 31, 2001 and U.S. patent application Ser. No. 10/039,088 titled "Resource Sharing Among Multiple RSVP Sessions" which was filed on Jan. 3, 2002, both of which are co-pending and commonly assigned.

BACKGROUND OF THE INVENTION

1. Field of the Invention

This invention relates to data networks and, more specifically, to sharing resources among data flows in a data network.

2. Background Information

A data network is a geographically distributed collection of nodes interconnected is by communication links and segments for transporting data between end nodes, such as personal computers and workstations. Many types of network segments are available, with the types ranging from local area networks (LANs) to wide area networks (WANs). LANs typically connect nodes over dedicated private communications links located in the same general physical location, such as a building or campus. WANs, on the other hand, typically connect large numbers of geographically dispersed nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

In a typical arrangement, end nodes in a data network are coupled via one or more intermediate nodes, such as routers. Routers are often configured to "route" data, such as packets, between various nodes in the network. Routing is typically performed at layer-3 (L3), which is the network layer of the Open Systems Interconnect Reference Model (OSI-RM). Routers often maintain forwarding databases (FDBs), which are typically configured to hold routing information including L3 addresses and interface information that the router uses to determine where data (e.g., data packets) are to be forwarded in order to reach their destination. For example, a router may have a routing database containing one or more entries wherein each entry contains a L3 destination address of a destination node and interface information about an interface on the router through which the destination node may be reached. A data packet containing a destination address that matches a destination address of an entry in the routing table is forwarded by the router to the interface specified by the matching entry for transfer to the destination node.

A router may execute one or more routing protocols that enable the router to route packets and exchange routing information with other routers in the network. The routers often use this information to configure (e.g., compute) their FDBs. The routing protocols may include distance-vector protocols, such as the Routing Information Protocol (RIP), or link-state protocols, such as the Intermediate-System-to-Intermediate-System (IS-IS) protocol or the Open Shortest Path First (OSPF) protocol. Routing information is typically exchanged between the routers in the form of advertisement messages. For example, nodes executing the IS-IS protocol exchange information using an advertisement message called a Link State Packet (LSP). Likewise, nodes executing the OSPF protocol exchange routing information using an advertisement message called a Link State Advertisement (LSA). As used herein, an advertisement message refers generically to a message that a routing protocol uses to convey routing information to other intermediate nodes (e.g., a router, a switch) in the network. An intermediate node that acquires an advertisement message may use information contained therein to update its FDB.

Data networks are increasingly being used to transport many forms of information including voice and video information. Voice information may be carried by various technologies including Voice over IP (VoIP). VoIP refers to a group of technologies that may be used to transmit voice information over data networks from a source (calling party) to a destination (called party). Such networks may include a plurality of voice agents that convert voice information from its traditional telephony form to a form that is suitable for packet transmission. In other words, the voice agent encodes, compresses and encapsulates the voice information into a plurality of data packets. Examples of voice agents include IP telephones, VoIP gateways, certain private branch exchanges (PBXs), personal computers (PCs) running communication applications, network devices providing voice gateway services, etc. A calling party uses a voice agent to initiate a VoIP call. Once the voice information has been converted into packet format, it is carried by the computer network to a second voice agent configured to serve the called party.

Similarly, video information may be carried by various technologies that include video conferencing. Here, voice and video information may be processed much like voice information is processed in VoIP systems. That is, voice and video information may be converted by a voice and video agent at a calling party which encodes, compresses and encapsulates the voice and video information into data packets and transfers the packets via a data network to a video agent at the called party. The called party's video agent may unencapsulate, uncompress and decode the data packets to produce the voice and video information and present this information to the called party, accordingly.

Voice and video agents may employ a "transcoder" to convert data coded using a particular coding stream into data that is coded according to a different coding scheme. For example, a transcoder may be used to convert voice data coded by a first codec (coder/decoder) that employs a particular coding/decoding scheme to voice data that may be decoded by a second codec that employs a different coding/decoding scheme. Transcoding data often changes the network bandwidth requirements associated with carrying the data. For example, the voice data coded by the first codec above may be carried on a data link with a bandwidth of 700 Kilobits-per-second (Kbps). The same voice data transcoded by the transcoder may be carried on a data link that has less bandwidth (e.g., 300 Kbps) due to, e.g., data compression introduced by the transcoder.

Voice and/or video information, unlike static data files or records, is highly sensitive to delayed and lost packets. That is, delays in receiving data packets or the loss of packets may seriously degrade the quality of the information as experienced at the called party's agent. Accordingly, packets carrying this information must be delivered to the called party with a high probability of success and in a timely manner.

Data networks typically incorporate various services and resources to mitigate the effects of delayed and lost packets. In particular, an intermediate device in the data network may provide specific resources and/or services that are configured to affect the rate at which traffic moves through the device in an effort to avoid traffic congestion in the network that may lead to lost or delayed traffic. These resources and/or services may include priority queues, filter settings, traffic shapers, queue selection strategies, congestion control algorithms, etc. Depending on the selection or allocation of such resources and services within the network, traffic may be forwarded at different rates and at different priorities in the network in an effort to avoid congestion and ensure timely delivery of the traffic.

Some applications may incorporate unidirectional data flows configured to transfer time-sensitive traffic from a source (sender) in a data network to a destination (receiver) in the network in accordance with a certain "quality of service" (QoS). Here, network resources may be reserved for the unidirectional flow to ensure that the QoS associated with the data flow is maintained. The Resource Reservation Protocol (RSVP) is a network-control protocol that enables applications to reserve resources in order to obtain special QoS for their data flows. RSVP works in conjunction with routing protocols to, e.g., reserve resources for a data flow in a data network in order to establish a level of QoS required by the data flow. RSVP is defined in R. Braden, et al., "Resource ReSerVation Protocol (RSVP)," Request For Comments (RFC) 2205.

Pursuant to RSVP, a data flow is a sequence of messages that have the same source address and same destination address (unicast or multicast). The messages of a flow also typically have the same protocol number and the same source and destination port numbers. A session is a collection of one or more data flows that have the same unicast or multicast destination address. Sessions typically utilize port and protocol numbers much like data flows. Sessions differ from data flows in that a session may have multiple senders, whereas a data flow only originates from a single sender.

In a protocol, such as RSVP, signaling messages are used to establish a reservation of resources to ensure sufficient resources are available for a data flow carrying e.g., time-sensitive data. RSVP defines two fundamental types of signaling messages, a RSVP path (Path) message and a RSVP reservation request (Resv) message.

Typically, Path messages are sent by sources to identify them and indicate, e.g., the bandwidth needed to receive their programming or content. These messages proceed on a path hop-by-hop through the data network to one or more receivers. The Path messages make intermediate devices (nodes) on the path aware of the possibility that a reservation of resources may be required. If a receiver is interested in the programming or content offered by a particular source, it responds with a RSVP Resv message to reserve the resources for a data flow between the sender and receiver. The Resv message travels hop-by-hop on the same path back to the source. At each hop, the corresponding intermediate device establishes a reservation for the receiver and sets aside (reserves) sufficient resources to accommodate the data flow between the sender and receiver. These resources are immediately made available to the data flow. If sufficient resources are not available, the reservation is refused explicitly so that the receiver knows it cannot depend on the corresponding resources being devoted to its traffic. By using RSVP, packets carrying, e.g., time-sensitive information can be accorded the resources and services they need to ensure timely delivery.

Resv messages typically include a set of options that are collectively called a reservation "style." These options are specified in an "option vector" field of the style object that is included in the Resv message. One option, "sharing control," concerns the treatment of reservations for different senders within the same session. This option can be specified to establish a different reservation for each upstream sender (distinct option) or make a single reservation that is "shared" among all packets of selected senders (shared option). Specifying the shared option enables the new reservation request to share resources that have already been allocated to an existing (prior) reservation. The shared option is typically used for sessions in which multiple data sources are unlikely to transmit simultaneously.

Another reservation option, "sender selection control," controls the selection of senders to the session. This option can be specified to select senders from a list of "explicit" senders (explicit option) or to select senders using a "wildcard" that implicitly selects all senders to the session (wildcard option). The sharing control together with the sender selection control "imply" (specify) the reservation style associated with the reservation request.

For example, the shared explicit (SE) style is specified by the combination of the shared and explicit options. A SE-style reservation creates a single reservation that is shared among a specific set of senders that are sending data to a given destination. The set (explicit list) of senders is specified using filter spec objects that are included in the Resv message. Likewise, the wildcard-filter (WF) style is specified by the combination of the shared and wildcard options. A WF-style reservation creates a single reservation into which data flows from all upstream senders are mixed. As new senders appear, the reservation is extended to include these new senders.

The sharing control and sender selection control options provide one technique for sharing resources among RSVP sessions. Another technique that can be used to share resources is described in co-pending and commonly assigned U.S. patent application Ser. No. 09/871,108 titled "System Sharing Resources Among RSVP Sessions." This technique uses a session group identifier (SGID) to enable resource sharing between different RSVP sessions that originate from a common source (sender) of traffic. Sessions that meet certain criteria defined by the technique are associated with a group that is designated by a SGID. Sessions within the same group share the resources that have been reserved for that group.

Specifically, a sourcing entity generates a locally unique resource identifier (ID). The sourcing entity then uses this resource ID when signaling to reserve resources for a first session. The sourcing entity may then decide to have these resources shared with a second session by reusing this same resource ID when signaling to reserve resources associated with the second session. When the second session is being created, intermediate devices are configured to recognize that a reservation associated with this resource ID already exists. The intermediate devices are further configured to share the previously reserved resources between the first and second sessions, rather than reserve additional or further resources for the second session.

One problem with the resource sharing techniques described above is that they require a common element between data flows, such as a common source or a common destination. For example, the SE and WF reservation techniques each require a common destination and the SGID technique requires a common source. Because the techniques require either a common source or common destination, they may not be well suited for scenarios involving, e.g., many different senders (sources) and receivers (destinations).

SUMMARY OF THE INVENTION

The present invention overcomes shortcomings associated with the prior art by providing a technique that enables resources to be shared among data flows that may have different senders (sources) and/or different receivers (destinations) in a data network. According to the technique, identifiers are used to indicate whether resources may be shared between data flows. The identifiers are carried in signaling messages used to reserve resources for the data flows.

In the illustrated embodiment, the Resource Reservation Protocol (RSVP) is used to reserve resources for data flows. Group identifiers (GIDs) are assigned to data flows based on, inter alia, whether the data flows can share resources. One or more existing data flows may share resources allocated to the existing data flows with the new data flow if the new data flow is associated with one or more GIDs that match one or more identifiers associated with the existing data flows. Intermediate nodes, on a path between a new data flow's sender and receiver, process a signaling message for the new data flow containing one or more GIDs associated with the new data flow by (i) determining if the GIDs indicate that resources may be shared with one or more existing data flows, and (ii) if so, enabling resources allocated to the one or more existing data flows to be shared with the new data flow.

Advantageously, by specifying resource sharing on the basis of a common identifier rather than a common source or destination, the inventive technique is an improvement over the prior art in that it enables data flows to share resources even though the data flows may be associated with different sources and different destinations.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 7 is a schematic block diagram of a group identifier (GID) object that may be advantageously used with the present invention;

FIG. 8 is an illustration of a session data structure that may be advantageously used with the present invention;

FIG. 9 is an illustration of a resource grant data structure that may be advantageously used with the present invention;

DETAILED DESCRIPTION OF AN ILLUSTRATIVE EMBODIMENT

Figure 1:
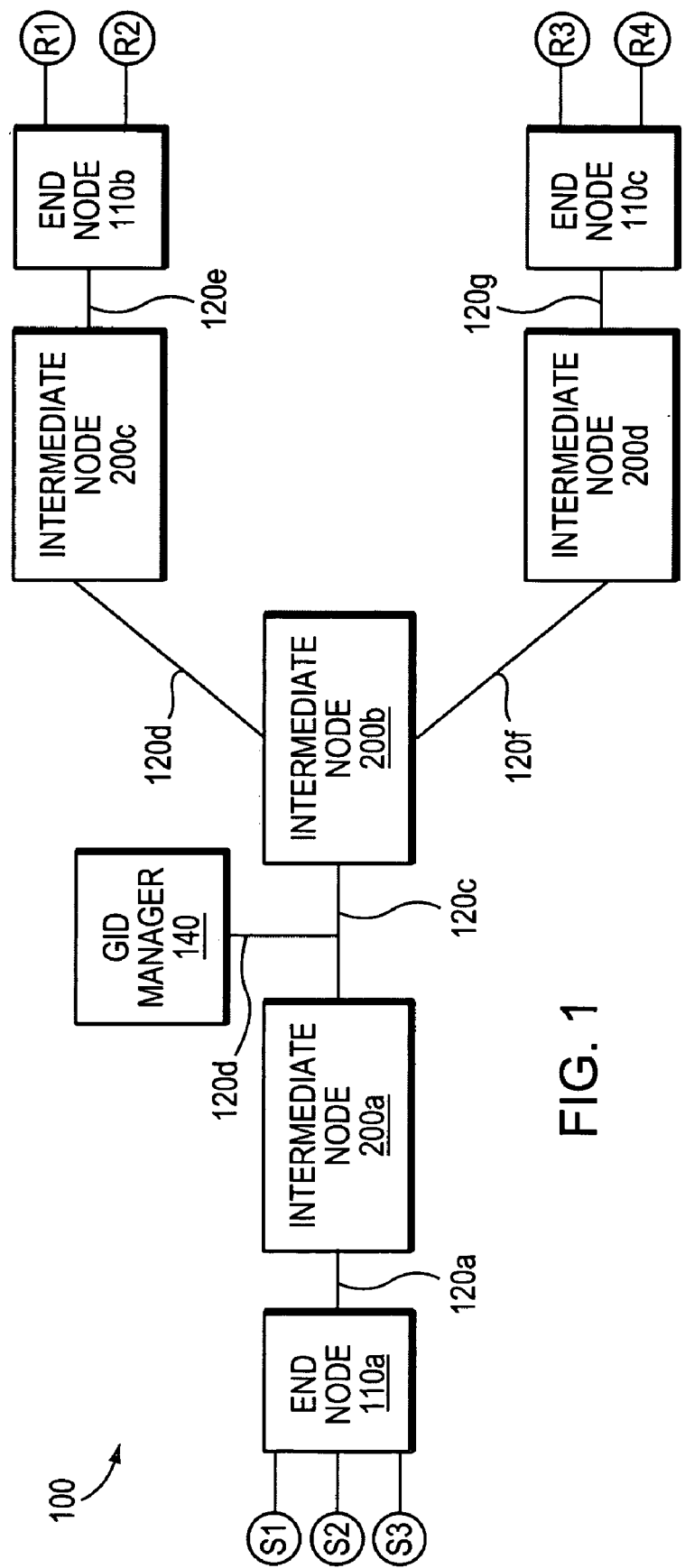
FIG. 1 is a schematic block diagram of a data network that may be advantageously used with the present invention.

FIG. 1 is a schematic block diagram of a data network 100 that may be advantageously used with the present invention. Data network 100 comprises a collection of communication links 120 connected to a plurality of nodes, such as end nodes 110 and intermediate nodes 200 to form an internetwork of nodes. These internetworked nodes communicate by exchanging data packets according to a predefined set of protocols, such as the Transmission Control Protocol/Internet Protocol (TCP/IP) and the Resource Reservation Protocol (RSVP).

In addition, network 100 includes an optional group identifier (GID) manager 140 which is a node, such as a central server, that is, inter alia, configured to distribute GIDs associated with various data flows in network 100. Specifically, the GID manager 140 is configured to generate and distribute GIDs to various senders (e.g., S1, S2, S3) and/or receivers (e.g., R1, R2, R3, R4) in the network via, e.g., a distribution protocol or messages. As used herein, a GID is an identifier that may be used to identify data flows that may share resources.

Illustratively, GID manager 140 generates GIDs using a Universally Unique Identifier (UUID) generation technique geared towards assuring global uniqueness. A UUID generation technique that may be used with the present invention is described in P. Leach et al., "A UUID URN Namespace," draft-mealling-uuid-urn-03.txt, available from the IETF and which is hereby incorporated in its entirety as though fully set forth herein. GID manager 140 then illustratively distributes the GIDs to other nodes in the network using a distribution technique, such as via a protocol. A protocol that may be used to distribute GIDs is described in M. Handley et al., "SIP: Session Initiation Protocol," RFC 2543, available from the Internet Engineering Task Force (IETF) and which is hereby incorporated by reference in its entirety as though fully set forth herein. Other distribution techniques may be used to distribute GIDs including e.g., the International Telecommunications Union (ITU) H.323 protocol standard, electronic mail (email) and so on.

It should be noted that in other embodiments of the invention, GIDs are generated and distributed by an intermediate node 200 in the network, or by an end node 110. In still other embodiments of the invention, a user configures a node with the GIDs and the node then disseminates the GIDs to other nodes in the network using a distribution technique, such as a protocol.

Figure 2:
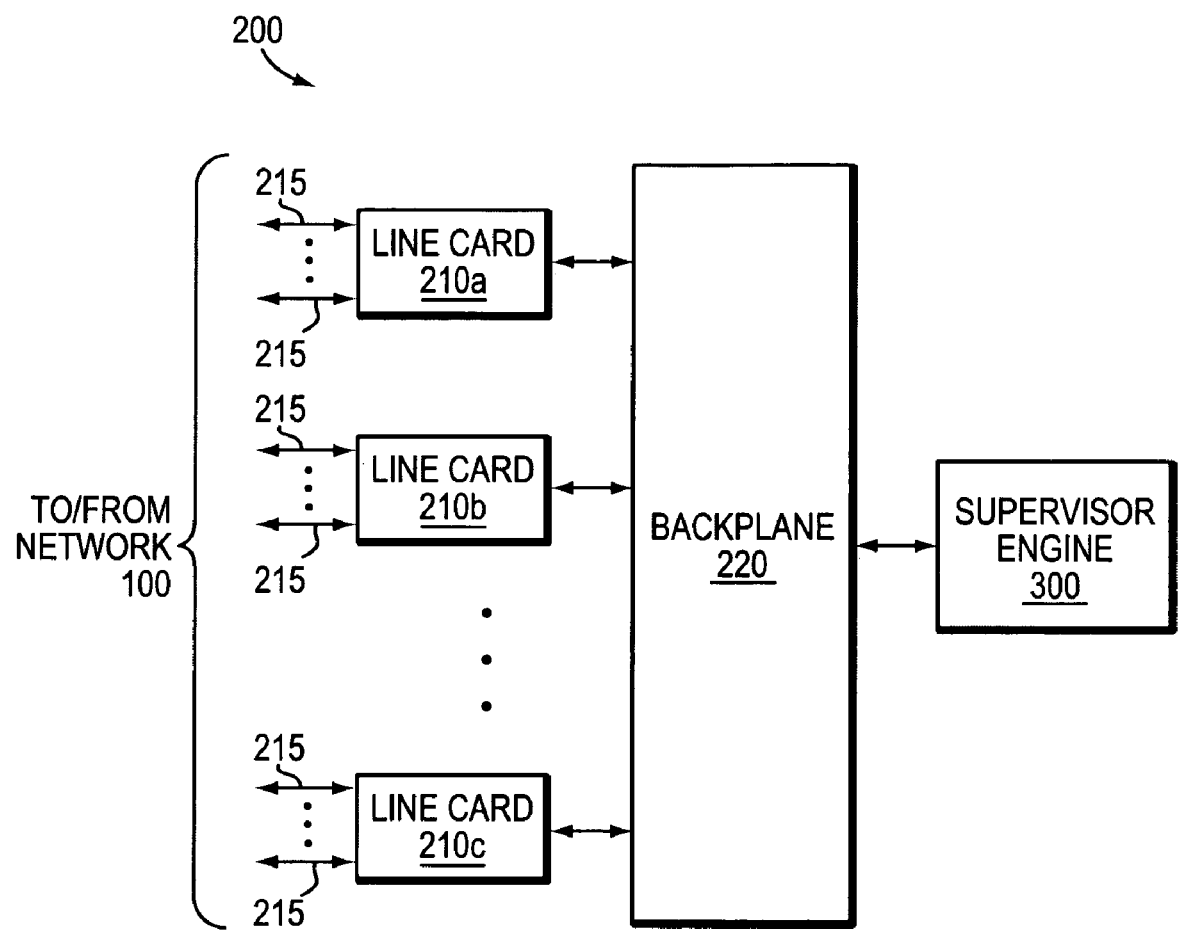
FIG. 2 is a high-level partial schematic block diagram of an intermediate node that may be advantageously used with the present invention.

FIG. 2 is a high-level partial schematic block diagram of an intermediate node 200 (e.g., a router) that may be advantageously used with the present invention. Suitable intermediate nodes that may be used with the present invention include the Cisco 7200 Series Routers and the Cisco 7600 Series Routers available from Cisco Systems Incorporated, San Jose, Calif. Intermediate node 200 comprises one or more line cards 210 and a supervisor engine card 300 interconnected by a backplane 220. Node 200 is configured to perform, inter alia, various conventional layer-2 (L2) and layer-3 (L3) switching and routing functions including forwarding and processing data packets in accordance with the inventive technique. As used herein, L2 and L3 refer to the data-link layer and network layer, respectively, of the Open Systems Interconnection reference model (OSI-RM). Node 200 may also be configured to support various combinations of protocols including, e.g., Open Shortest Path First (OSPF), Intermediate-System-to-Intermediate-System (IS-IS), Multiprotocol Label Switching (MPLS), TCP/IP, RSVP, Ethernet, Asynchronous Transfer Mode (ATM), and multi-channel T3.

The backplane 220 comprises a point-to-point interconnect fabric that interconnects the various cards and allows data and signals to be transferred from one card to another. The line cards 210 connect (interface) the intermediate node 200 with the network 100. To that end, the line cards 210 transfer and acquire data packets to and from the network via ports 215 using various protocols such as, e.g., ATM, Ethernet, and T3. Functionally, the line cards 210 acquire data packets from the network 100 via the ports 215 and forward the data packets to the backplane 220, as well as transfer data packets acquired from the backplane 220 to the network 100 via the ports 215. The ports 215 may comprise, e.g., ATM, Ethernet, Fast Ethernet (FE), Gigabit Ethernet (GE), and frame relay (FR) ports.

Figure 3:
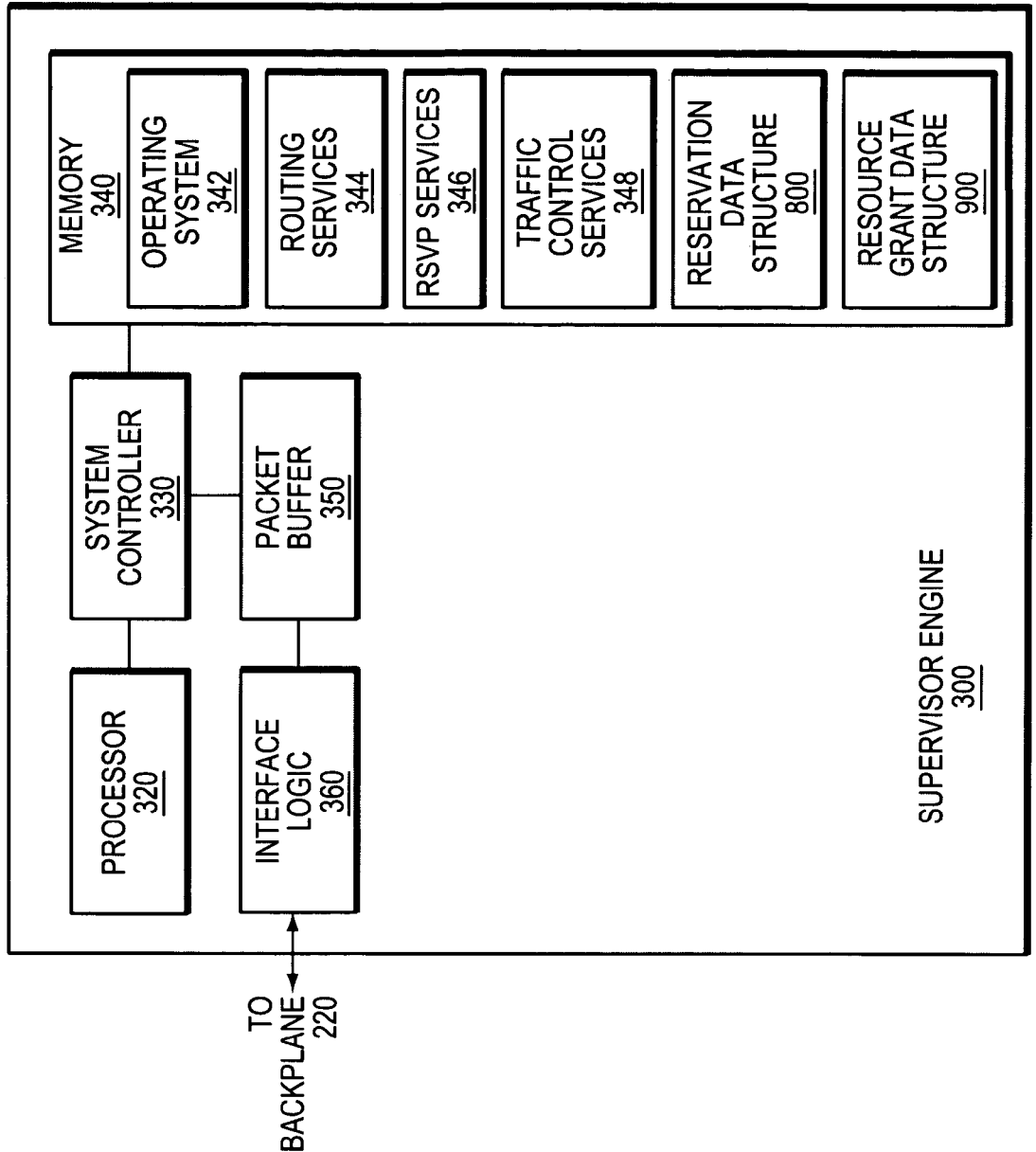
FIG. 3 is a high-level partial schematic block diagram of a supervisor engine that may be advantageously used with the present invention.

The supervisor engine 300 comprises logic that is, inter alia, configured to manage node 200, execute various protocols, such as RSVP, and perform other functions including, e.g., processing RSVP messages in accordance with the inventive technique. FIG. 3 is a high-level partial schematic block diagram of a supervisor engine 300 that may be advantageously used with the present invention. Supervisor engine 300 comprises a processor 320, system controller 330, interface logic 360, packet buffer 350 and memory 340. The memory 340 comprises random-access memory (RAM) locations addressable by the system controller 330 for storing, inter alia, data structures and software programs related to the inventive technique. Interface logic 360 is coupled to the backplane 220, and is configured to transfer data between the backplane 220 and the supervisor engine 300. Packet buffer 350 is a memory comprising high-speed RAM devices capable of storing data packets acquired by the interface logic 360 and processed by the processor 320.

System controller 330 is coupled to the processor 320, memory 340 and packet buffer 350 and comprises circuitry configured to enable processor 320 to access (e.g., read, write) memory locations contained in the memory 340 and the packet buffer 350. Processor 320 is a conventional processor configured to execute instructions contained in memory 340 for, inter alia, processing RSVP messages in accordance with the inventive technique.

The memory 340 is a computer readable medium comprising RAM devices, such as dynamic random access memory (DRAM) devices, configured to implement e.g., a 128 Megabyte (Mb) RAM. Illustratively, memory 340 contains various software and data structures used by processor 320 including software and data structures that implement aspects of the present invention. One skilled in the art would know that other computer readable mediums, such as disk storage units and flash memory, may be used to store computer executable instructions and data structures that implement aspects of the present invention. Memory 340 contains operating system 342, routing services 344, RSVP services 346, traffic control services 348, reservation data structure 800 and resource grant data structure 900.

Operating system 342 contains computer executable instructions executed by processor 320 to functionally organize the intermediate node 200 by, inter alia, invoking operations in support of software processes and services executing on the supervisor engine 300, such as routing services 344, RSVP services 346 and traffic control services 348. These services and processes may include software functions that implement various routing and switching protocols supported by the intermediate node 200 as well as functions that implement aspects of the present invention.

Routing services 344 contain computer executable instructions executed by processor 320 to perform functions provided by various routing protocols, such as OSPF and IS-IS. These functions may be configured to manage a forwarding information database (not shown) containing, e.g., data used to make forwarding decisions. RSVP services 346 contain computer executable instructions for implementing RSVP and processing RSVP messages in accordance with the present invention. RSVP is described in R. Braden, et al., "Resource ReSerVation Protocol (RSVP)," Request For Comments (RFC) 2205, September 1997, available from the IETF and which is hereby incorporated by reference as though fully set forth herein.

The reservation data structure 800 and the resource grant data structure 900 are, as will be described further below, data structures illustratively organized as tables that contain information (data) related to reservations processed by intermediate node 200.

Figure 4:
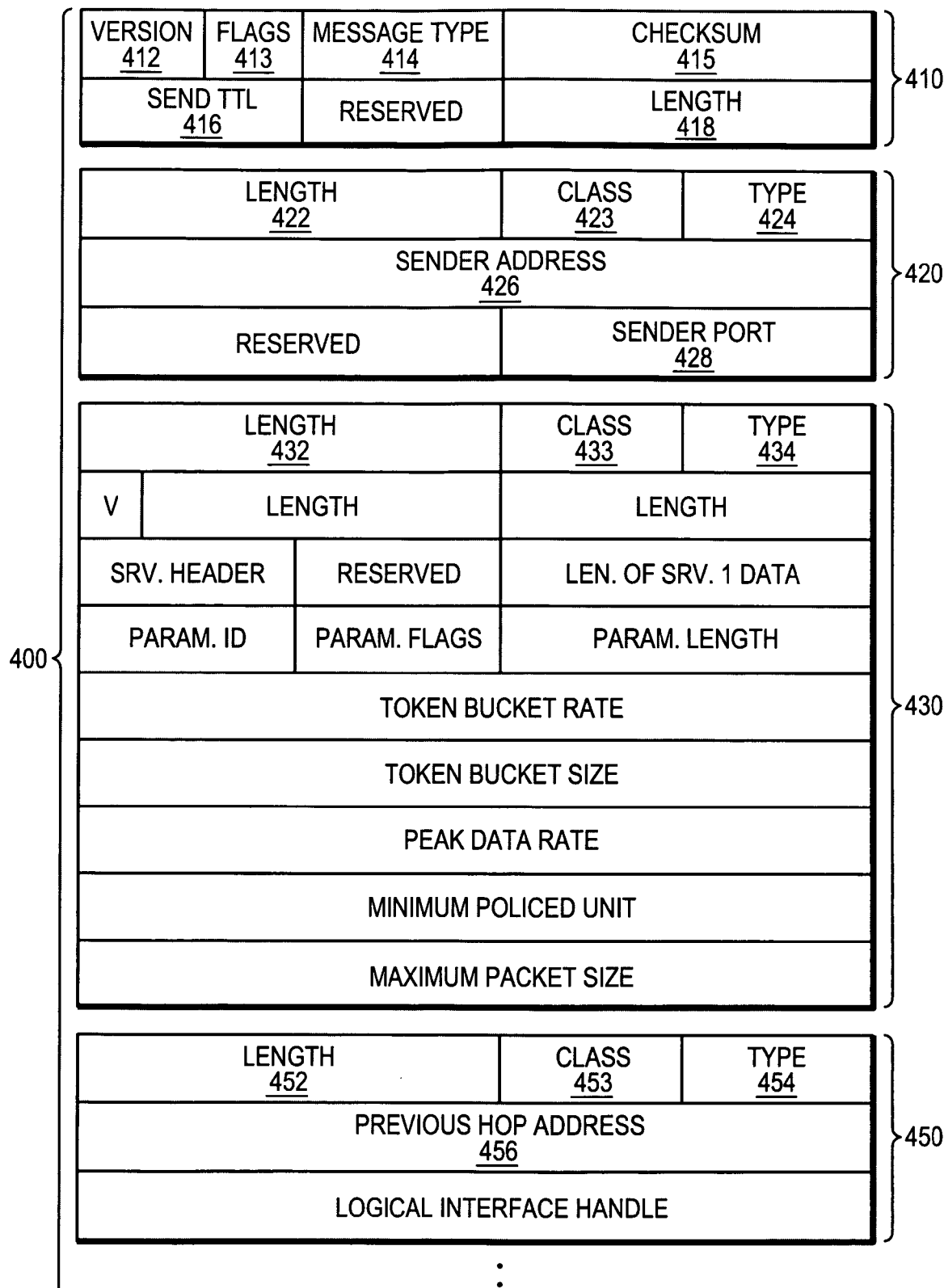
FIG. 4 is schematic block diagram of a Resource Reservation Protocol (RSVP) Path message that may be advantageously used with the present invention.

In accordance with RSVP, to establish a data flow between a sender and a receiver, the sender may send a RSVP path (Path) message downstream hop-by-hop along a path (e.g., a unicast route) to the receiver to identify the sender and indicate e.g., bandwidth needed to accommodate the data flow. The Path message may contain various information about the data flow including, e.g., traffic characteristics of the data flow. FIG. 4 is a schematic block diagram of a RSVP Path message 400 that may be advantageously used with the present invention. Message 400 contains a common header 410, a sender template object 420, a traffic specification (Tspec) object 430 and a "previous-hop" object 450. It should be noted that message 400 may contain other objects including a GID object (described further below).

The common header 410 contains information about the message 400. Specifically, the header 410 comprises a version field 412, a flags field 413, a message type field 414, a checksum field 415, a send "time-to-live" (TTL) field 416 and a length field 418. The version field 412 holds a version number that identifies the version of RSVP associated with the message. The flags field 413 holds flags associated with the message. The message type field 414 holds an identifier (ID) that identifies a type of RSVP message, such as, an RSVP Path message, RSVP reservation request (Resv) message and so on. The checksum field 415 holds a value that represents a checksum of the message 400. The send TTL field 416 holds a value that represents a "time-to-live" value for the message 400 and the length field 418 holds a value that represents the length of the message 400, illustratively in bytes.

The sender template object 420 contains an object header comprising length 422, class 423 and type fields 424 as well as sender address 426 and port 428 fields that hold information associated with the sender. Specifically, the length field 422 holds a value that represents a length of the object 420, illustratively in bytes. The class field 423 holds a value that identifies the object as belonging to a particular class, such as the RSVP SENDER_TEMPLATE class. The type field 424 holds a value that indicates a type object within the object's class, such as an IP version 4 (IPv4) type object or an IP version 6 (IPv6) type object. The sender address field 426 holds a value representing an address (e.g., IPv4 address, IPv6 address) associated with the sender and the sender port field 428 holds a value representing a port (e.g., IPv4 port, IPv6 port) associated with the sender.

The Tspec object 430 contains an object header comprising a length field 432, a class field 433 and a type field 434. Specifically, the length field 432 holds a value that represents a length of the object 430, illustratively in bytes. The class field 433 holds a value that indicates a class of the object, such as the RSVP SENDER_TSPEC class. The type field 434 holds a value that indicates the type of object within the class. In addition to the object header, the Tspec object 430 may contain various traffic parameters defined in various well-known "int-serv" working group documents, such as S. Shenker, et al., "General Characterization Parameters for Integrated Service Elements," RFC 2215, available from the IETF and which is hereby incorporated by reference as though fully set forth herein.

The previous-hop object 450 contains an object header, comprising length 452, class 453 and type fields 454, and a previous hop address 456 field. The length field 452 holds a value that represents a length of the object 450, illustratively in bytes. The class field 453 holds a value that identifies the object as belonging to a particular class, such as the RSVP RSVP_HOP class. The type field 454 holds a value that indicates a type object within the class, such as, e.g., IPv4 type object and IPv6 type object. The previous hop address field 456 holds a value that represents an address (e.g., IPv4 address, IPv6 address) associated with the previous hop node. Note that object 450 may contain other fields, such as a logical interface handle field which contains a value that distinguishes logical outgoing interfaces associated with the path message 400.

In accordance with RSVP, a receiver establishes a new reservation for resources for a data flow between a sender and a receiver by responding to the sender's Path message with a reservation request (Resv) message. The Resv message travels upstream hop-by-hop along the path used by the Path message from the receiver to the sender. The Resv message contains information that is used by intermediate nodes along the path to reserve resources for the data flow.

Figure 5:
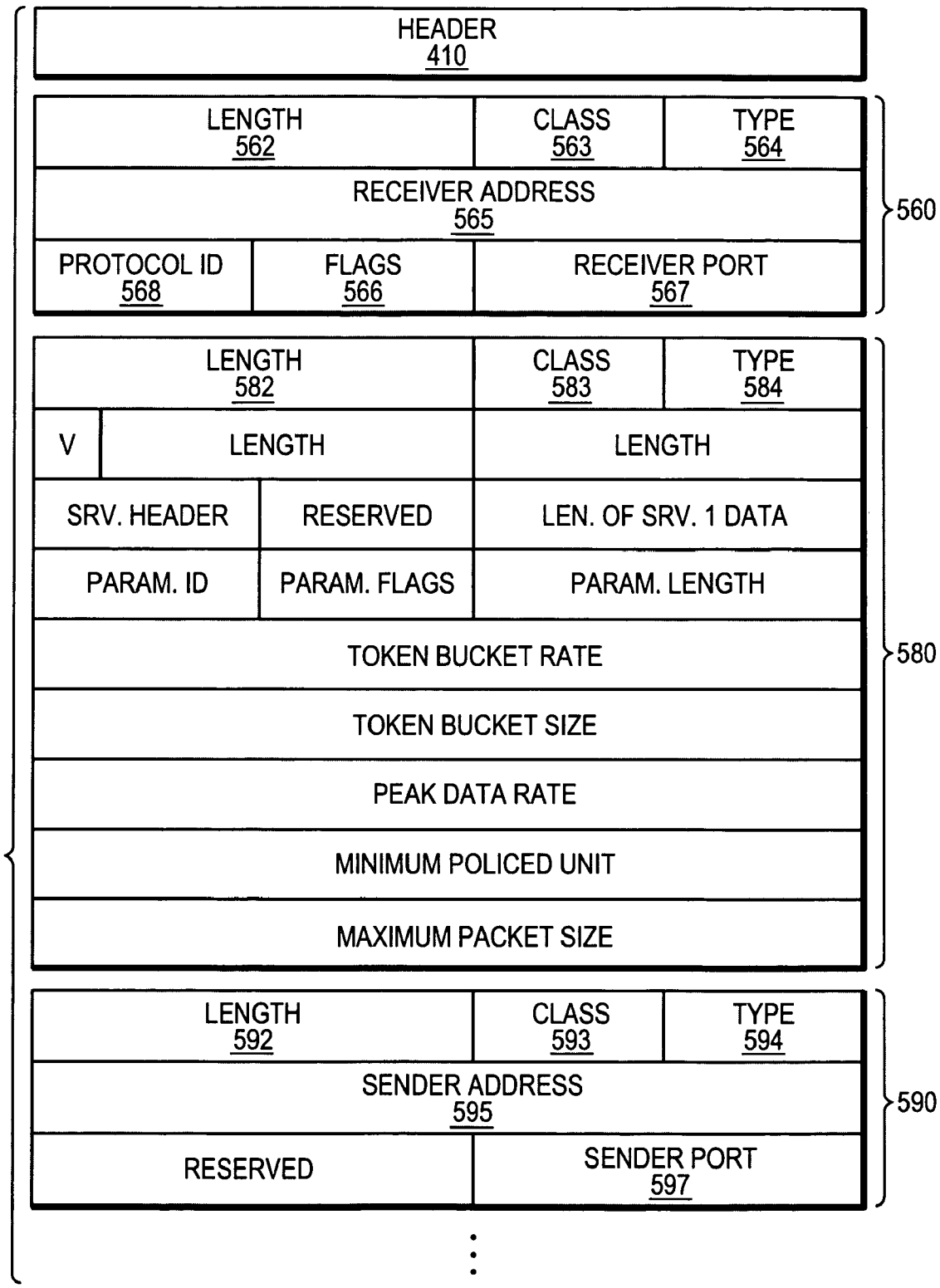
FIG. 5 is a schematic block diagram of a RSVP Resv message that may be advantageously used with the present invention.

FIG. 5 is a schematic block diagram of a RSVP Resv message 500 that may be advantageously used with the present invention. Message 500 contains a common header 410, session object 560, a flow specification (flowspec) object 580 and a filter specification (filter spec) object 590. It should be noted that the Resv message may contain other objects, such as a GID object (discussed further below).

The common header 410 contains information, as described above, wherein the message type field 414 contains a value that identifies the message as a Resv message. The session object 560 contains information about the data flow for which resources are being reserved. Specifically, the session object contains a length field 562, class field 563, type field 564, a receiver address field 565, a protocol ID field 568, a flags field 566 and a receiver port field 567. The length field 562 holds a value that represents a length of the object 560, illustratively in bytes. The class field 563 holds a value that identifies is the object 560 as belonging to, e.g., the RSVP SESSION class. The type field 564 holds a value that indicates a type of the object (e.g., IPv4 session object, IPv6 session object) within the class. The receiver address 565 and receiver port 567 fields illustratively hold an address (e.g., IP address) and a port (e.g., IP port), respectively, that are associated with the data flow's receiver. The protocol ID field 568 holds an identifier that identifies a protocol associated with the data flow and the flags field 566 holds various flags associated with the data flow.

The flowspec object 580 contains information that defines various traffic characteristics associated with the new reservation. Specifically, the flowspec object 580 contains an object header, comprising length 582, class 583 and type 584 fields, and various traffic parameters. The length field 582 holds a value that represents a length of the object 580, illustratively in bytes. The class field 583 holds a value that indicates the object 580 belongs to, e.g., the RSVP FLOW-SPEC class and the type field 584 holds a value that indicates a type of object within the class. The traffic parameters may include parameters defined in various "int-serv" working group documents, such as parameters described in previously incorporated RFC 2215.

The filter spec object 590 contains information related to the sender. Specifically, the filter spec object 590 contains length 592, class 593, type 594, sender address 595 and sender port 597 fields. The length field 592 holds a value that represents the size of the object 590, illustratively in bytes. The class field 593 holds a value that indicates the object belongs to e.g., the RSVP FILTER_SPEC class and the type field 594 holds a value that indicates a type of address (e.g., IPv4, IPv6) held in the sender address 595 and port 597 fields. The sender address 595 and sender port 597 fields hold an address and port, respectively, of the data flow's sender.

Figure 6:
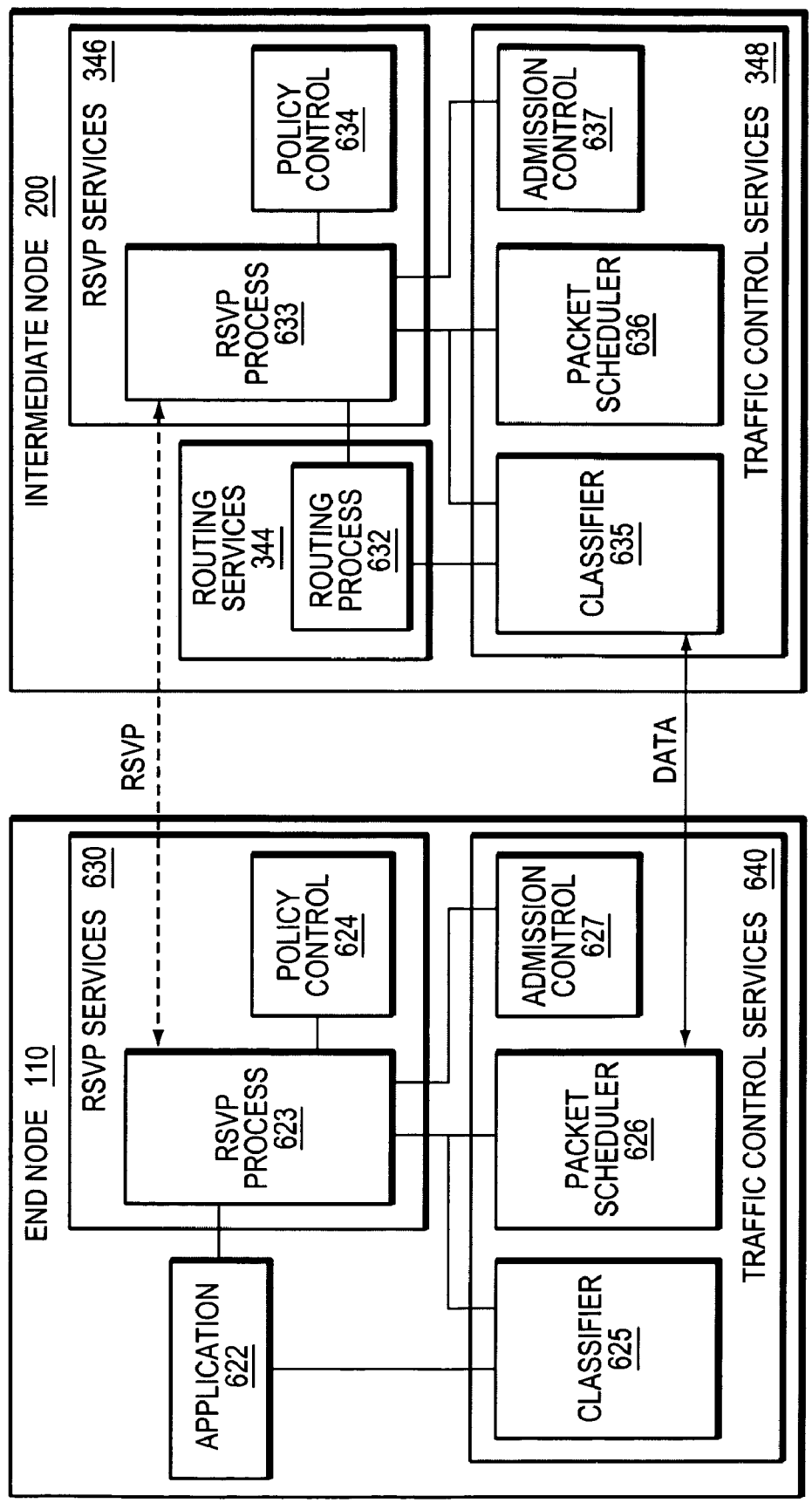
FIG. 6 is a high-level block diagram illustrating various functional blocks associated with RSVP.

End nodes 110 and intermediate nodes 200 contain various services that provide support for RSVP on these nodes. FIG. 6 is a schematic block diagram of various functional blocks involved in providing RSVP support, such as processing RSVP messages, in an end node 110 and an intermediate node 200. End node 110 comprises an application 622 which interfaces with RSVP services 630 and traffic control services 640. The RSVP services 630 comprise a RSVP process 623 and a policy control function 624. The application 622 may issue various requests to reserve resources for data flows associated with the application 622. The RSVP process 623 processes the requests, and generates and issues various signaling messages (e.g., Path messages 400, Resv messages 500) in response to the requests. These messages may be used to communicate at the RSVP level with the RSVP process 633 in the intermediate node 200. The policy control function 624 may determine, for example, whether a user has permission to make a particular reservation.

Quality of Service (QoS) for a data flow on the end node 110 is implemented by functions in the traffic control services 640. These functions include the classifier 625, packet scheduler 626 and admission control 627 functions. The classifier 625 determines a QoS class for packets issued by the end node 110. The packet scheduler 626 determines when the issued packets are forwarded from the end node 110 to the intermediate node 200. The admission control function 627 determines whether the end node 110 contains sufficient resources that may be allocated to a new reservation associated with a data flow.

Assume the end node 110 is a receiver on a path between a sender and a receiver and that the application 622 has received a Path message from a sender. Further assume, in response to the Path message, the application 622 establishes a new reservation for a data flow between the sender and receiver by issuing a request that identifies QoS requirements for the data flow to the RSVP process 623. The RSVP process 623 in conjunction with the policy control 624 and admission control 627 functions determine if the application has permission to establish the new reservation and, if so, whether sufficient resources exist on the end node 110 to meet the requirements (QoS) of the new reservation. If both checks succeed, various parameters are set in the packet classifier 625 and packet scheduler 626 to reserve sufficient resources on the end node 110 to obtain the requested QoS for the new reservation. Further, the RSVP process 623 may generate various RSVP messages (e.g., Resv message) that are forwarded to the sender via intermediate node 200.

The intermediate node 200 contains a RSVP process 633, a policy control function 634, a classifier function 635, a packet scheduler 636 and an admission control function 637. In addition, the intermediate node contains a routing process 632 which may be configured to implement various routing protocols, such as OSPF and IS-IS. The RSVP process 633 and policy control function 634 are illustratively contained in the intermediate node's RSVP services 346. The classifier 635, packet scheduler 636, and admission control 637 functions are illustratively contained in the intermediate node's traffic control services 348.

The RSVP process 633 processes RSVP signaling messages (e.g., Resv messages, Path messages) acquired by the intermediate node 200. This processing may include checking whether the nodes issuing the messages have permission to make reservations, and checking the available resources on the intermediate node 200 to determine if sufficient resources are available for the reservations. If both checks succeed, various parameters are established in the intermediate node's packet classifier 635 and packet scheduler 636 to obtain a QoS requested by the signaling messages. Further, the intermediate node 200 may forward the acquired RSVP messages to the next intermediate node in the path associated with the various reservations.

It should be noted that the functional blocks illustrated in FIG. 6 may be implemented in hardware, software or firmware or some combination thereof.

The present invention overcomes shortcomings associated with the prior art by incorporating a technique that enables resources in a data network to be shared between data flows that may have different senders (sources) and/or different receivers (destinations). According to the technique, identifiers are used to indicate whether resources may be shared between data flows. The identifiers are carried in signaling messages used to reserve resources for the data flows.

In accordance with the inventive technique, GIDs associated with a particular data flow are specified in a GID object that is contained in one or more signaling messages associated with the data flow. FIG. 7 is a schematic block diagram of a GID object 700 that may be included in a signaling message (e.g., Path message, Resv message) associated with a data flow to convey GID information for the data flow. Object 700 comprises a length field 720, a class field 730, a type field 740 and a GID set field 770. The length field 720 holds a value that indicates the length of the object 700, illustratively in bytes. The class field 730 holds a value that identifies the object 700 as belonging to, e.g., a newly defined "GID" class. The type field 740 holds a value that indicates a type of the object within the class. Illustratively, this value is set to 1 to indicate the object is a GID object. The GID set field 770 holds a set of one or more GIDs associated with the data flow.

Each intermediate node 200 in network 100 maintains information associated with reservations for data flows processed by the node 200 in the node's reservation data structure 800. FIG. 8 is an illustration of a reservation data structure 800 that may be advantageously used with the present invention. Data structure 800 is illustratively represented as a table comprising one or more entries 810 wherein each entry 810 is associated with a data flow and contains information related to the data flow including a reservation ID field 830, a sender address field 840, a sender port field 850, a receiver address field 860, a receiver port field 870, a resource allocation field 880 and a GID set field 890. It should be noted that entry 810 may contain other fields, such as a previous hop field that holds an address of a previous hop in the path traversed by the data flow or a valid field that indicates whether the entry 810 contains valid information. Further, data structure 800 may be organized as a series of tables that may include, for example, a session table that holds information (e.g., state) about RSVP sessions, a sender table that holds information about senders and a reservation table that holds information about RSVP reservations processed by the intermediate node 200.

As noted above, each entry 810 holds information about a data flow processed by the intermediate node 200. Specifically, the reservation ID field 830 holds an identifier that identifies the entry's data flow. The sender address 840 and sender port 850 fields hold address (e.g., IP address) and port (e.g., IP port) information, respectively, associated with a sender of the data flow, whereas the receiver address field 860 and receiver port field 870 hold address and port information, respectively, associated with the receiver of the data flow. The resource allocation field 880 holds a value that represents an amount of resources allocated to the entry's data flow. Illustratively, this amount represents a bandwidth in Kilobytes-per-second (Kbps) allocated to the data flow. It should be noted that the amount may be multidimensional in that it may represent e.g., a combination of bandwidth and burst size. The GID set field 890 holds a set of values that represent GIDs associated with the entry's data flow.

In addition to the reservation data structure 800, each intermediate node maintains a resource grant data structure. FIG. 9 is a schematic block diagram of a resource grant data structure 900 that may be advantageously used with the present invention. Data structure 900 is illustratively organized as a table comprising one or more entries 910. Each entry 910 represents resources allocated to a set of common GIDs and contains an entry identifier (ID) field 920, a resource allocation field 930, a common GID field 940 and a serving flows field 950. The entry ID field 920 holds a value that uniquely identifies the entry 910. The resource allocation field 930 holds a value that represents an amount of resources allocated to the set of common GIDs associated with the entry 910. The common GID field 940 holds a value that represents, inter alia, a set of GIDs that are in common with the data flows represented in the serving flows field 950. The serving flows field 950 holds a set of data flow identifiers that represent data flows associated with the entry 910.

Figure 10A:
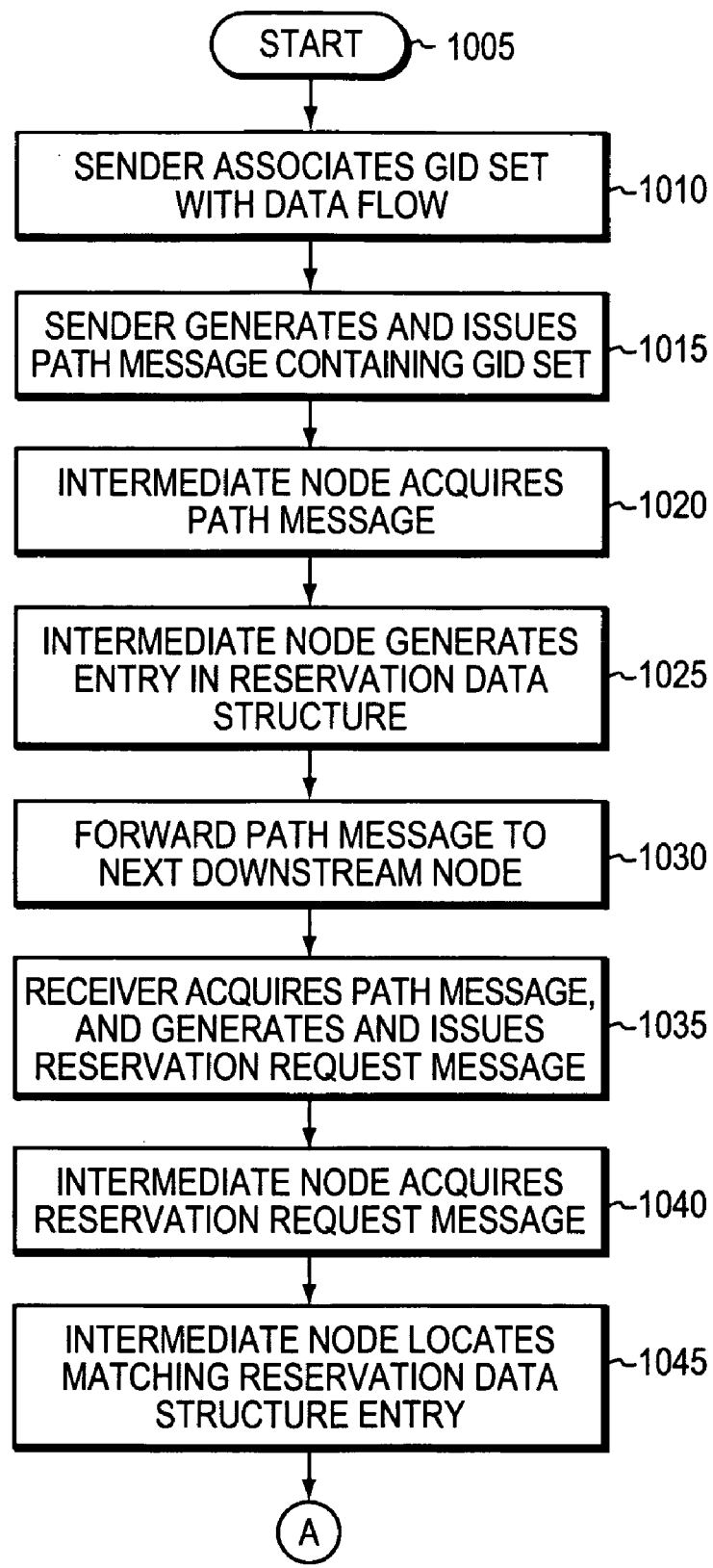
FIGS. 10A-B are flow diagrams of a sequence of steps that may be used to process a path message containing a GID set in accordance with the present invention.
Figure 10B:
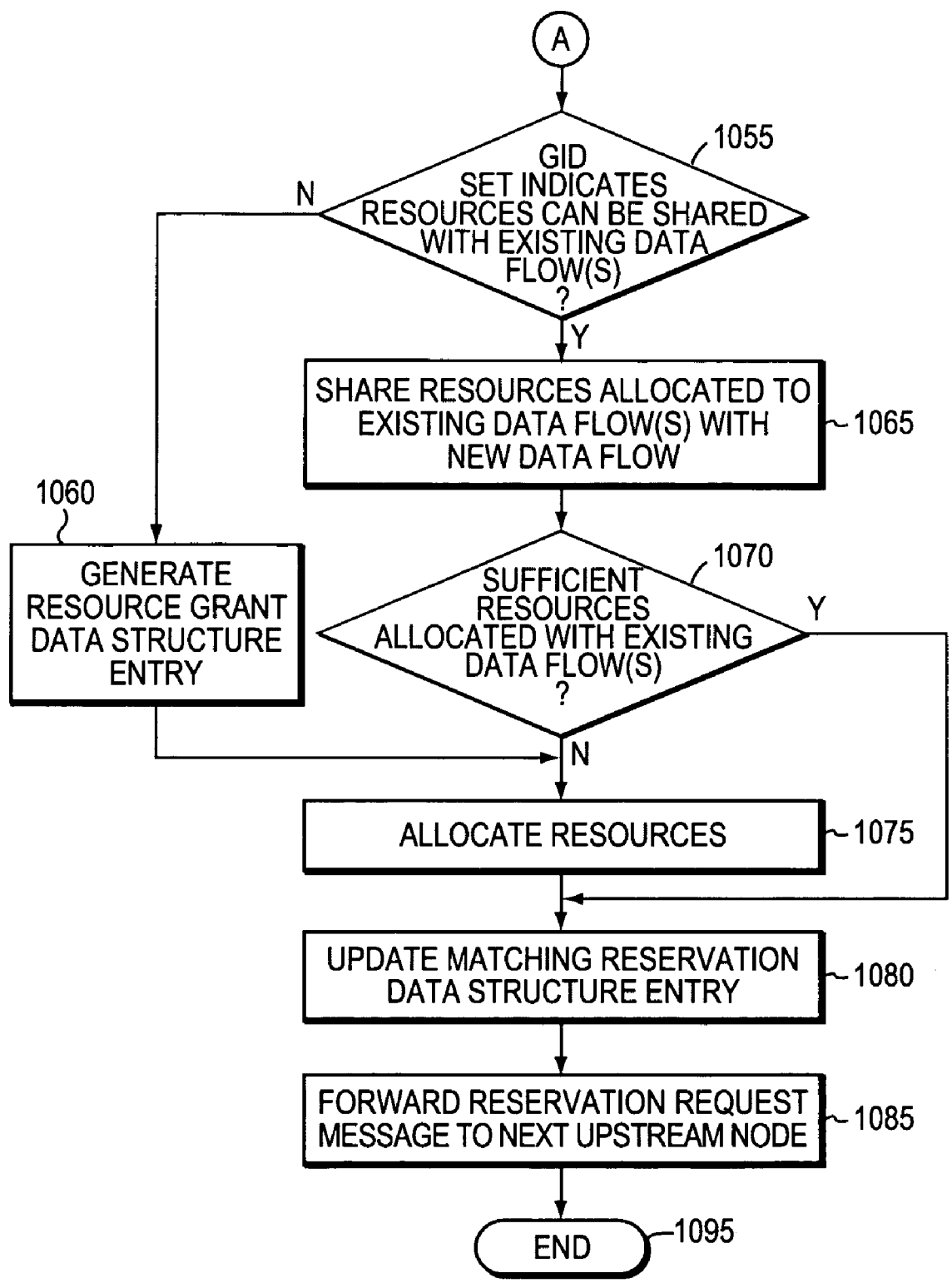

FIGS. 10A-B are a flow diagram of a sequence of steps that may be used to reserve resources for a new data flow between a sender and a receiver in a data network using a path message containing GID information in accordance with the inventive technique. The sequence begins at Step 1005 and proceeds to Step 1010 where the sender associates the new data flow with a set of one or more GIDs. Illustratively, the sender acquires the set of GIDs for the new data flow from the GID manager 140 via a protocol as described above. Alternatively, the sender may be pre-configured with the set of GIDs.

At Step 1015, the sender generates and issues a path message containing the set of GIDs for the new data flow. Illustratively, the sender generates a RSVP Path message 400 in a conventional manner and stores a GID set object 700 in the message 400 is wherein the GID set object 700 contains the set of GIDs associated with the new data flow in the object's GID set field 770. The sender then issues the Path message 400 by forwarding it onto the network towards the receiver.

At Steps 1020 and 1025, an intermediate node 200 in a path between the sender and receiver acquires the path message and, in response, generates an entry 810 for the new data flow in its reservation data structure 800. Illustratively, the intermediate node's RSVP services 346 allocates an entry 810 for the new data flow from the data structure 800 and assigns a unique reservation ID 830 to the entry 810. In addition, the RSVP services 346 stores the Path message's sender address 426, sender port 438 and GID set 770 in the sender address 840, sender port 850 and GID set 890 fields of the entry 810, respectively. It should be noted that in other embodiments of the invention, state associated with the Path state and state associated with the Resv message are maintained in separate state blocks contained in e.g., separate tables. The RSVP services 346 then determines the amount of resources (e.g., bandwidth) required by the new data flow from, e.g., a Tspec object 430 contained in the Path message 400, and stores a value that represents this amount in the resource allocation field 880 of the entry 810. The intermediate node 200 then forwards the path message to the next downstream node (Step 1030).

At Step 1035, eventually, the receiver acquires the path message and, in response, generates and issues a reservation request message to reserve resources for the new data flow. Illustratively, the receiver generates a conventional RSVP Resv message 500 to respond to the Path message 400. The receiver then forwards the reservation request message 500 onto the data network on the path upstream to the sender.

At Step 1040, an intermediate node 200, on the path between the receiver and sender, acquires the reservation request message and at Step 1045 locates an entry 810 in its reservation data structure 800 associated with the new data flow. At Step 1055 (FIG. 10B), using the new data flow's GID set, the intermediate node 200 determines if resources of existing data flows can be shared with the new data flow. Illustratively, the intermediate node 200 searches the resource grant data structure 900 to identify one or more entries 910 whose common GID set field 940 contains one or more GIDs that are a subset of the GIDs associated with the new data flow. The intermediate node 200 then selects one or more entries from the identified entries that have sufficient resources that may be shared with the new data flow and updates the one or more selected entries to include the new data flow. The entries may be selected using e.g., well-known "sequential search" or "best fit" algorithms wherein selection is based on the amount of resources indicated in the resource allocation fields 930 and the amount of resources needed for the new data flow.

If no entries are selected, the intermediate node 200 concludes that resources cannot be shared with existing data flows and the sequence proceeds to Step 1060 were the intermediate node 200 generates a resource grant data structure entry 910. Illustratively, the intermediate node 200 generates the entry 910 by allocating it from the resource grant data structure 900, placing the GID set entries associated with the new data flow in the entry's common GID field 940 and placing the new data flow's ID in the entry's serving flows field 950. The sequence then proceeds to Step 1075.

If at Step 1055 the intermediate node 200 determines that resources with one or more existing data flows can be shared with the new data flow (e.g., one or more entries 910 are selected), the sequence proceeds to Step 1065 where the intermediate node 200 shares resources allocated to existing data flows with the new data flow. Illustratively, the intermediate node 200 adds the new data flow to the serving flows fields 950 of the selected entries and removes GIDs not associated with the new data flow from the entries' common GID fields 940.

At Step 1070, a check is performed by the intermediate node 200 to determine if sufficient resources have been allocated to the new data flow from existing data flows. If so, the sequence proceeds to Step 1080. Otherwise, the sequence proceeds to Step 1075 where resources, additional or otherwise, are allocated to accommodate the new data flow and the resource grant data structure 900 is updated to reflect the resources allocated to the new data flow. Illustratively, the intermediate node's admission control function 637 determines if the new data flow is entitled to reserve resources on the intermediate node. If so, the policy control function 634 determines the amount of resources needed to accommodate new data flow, determines if the resources are available and, if so, reserves the resources for the new data flow based on the data flow's resource allocation information 880. The resource allocation fields 930 resource grant data structure entries associated with the new data flow (i.e., contain the new data flow's flow ID in the serving flows field 950) are then updated to reflect the resources granted to the new data flow.

At Step 1080, the reservation data structure entry 810 associated with the new data flow is updated to reflect the resources (if any) allocated to the new data flow. In addition, illustratively, the receiver address 565 and port 567 contained in the Resv message 500 are used to update the contents of the new data flow's receiver address 860 and receiver port 870 fields, respectively. At Step 1085, the reservation request message is forwarded to the next upstream node. The sequence ends at Step 1095.

For example, referring to FIGS. 1 and 10, assume resources are to be reserved for three data flows T1, T2 and T3. Further, assume T1 is a unicast data flow between S1 and R1, T2 is a multicast data flow between S2 and R2 and T3 is a multicast data flow between S2 and R3. In addition, assume that the resources needed for data flows T1, T2 and T3 are 700, 300 and 300 Kbps, respectively. Also, assume the GID set for data flow T1 is {X}, the GID set for data flow T2 is {X, Z} and the GID set for data flow T3 is {Z}.

Now assume a data flow T1 is established between S1 and R1. At Steps 1010-1015, sender S1 directs node 110a to issue and forward a path message containing a GID set comprising a single member "X." At Step 1020, intermediate node 200a acquires the path message, and at Step 1025, generates entry 810a in its reservation data structure 800 storing the GID set (i.e., X) in the GID set field 880 of the entry 810a. At Step 1030, intermediate node 200a forwards the path message to next down stream node (i.e., node 200b).

Intermediate nodes along the path between S1 and R1 (e.g., nodes 200b and 200c) process the path message in accordance with Steps 1020-1030, generating entries 810 in their reservation data structures as described above. Eventually, node 110b acquires the path message, processes it and notifies R1 that a path message has been received from S1. R1 directs node 110b to generate a reservation request message and forward the message upstream to S1 (Step 1035). At Step 1040, intermediate node 200c acquires the reservation request message and, at Step 1045, locates an entry (i.e., 810a) in its data structure 800 associated with the new data flow T1.

At Step 1055, intermediate node 200c determines if the GID set 890 of the new data flow's entry 810a indicates resources can be shared with one or more existing data flows. Illustratively, intermediate node 200c scans the resource grant data structure 900 to identify entries 910 whose common GID fields 940 contain GIDs that match one or more of the GIDs in the new data flow entry's GID set 880. Assuming that no entries are identified, the sequence proceeds to Step 1060 where the intermediate node 200c generates a resource grant data structure entry. Illustratively, the intermediate node 200 allocates an entry (e.g., 910a) in the resource grant data structure 900, and initializes it including (i) placing an ID for the entry in the entry's ID field 920, (ii) placing the amount of resources allocated for the new data flow T1 (i.e., 700 Kbps) in the entry's resource allocation field 930, (iii) placing the GID set associated with the new data flow in the entry's common GID field 940 and (iv) placing the data flow's identifier (i.e., T1) in the entry's serving flows field 950.

At Step 1075, the intermediate node 200c allocates resources for the new data flow T1. Illustratively, intermediate node 200c allocates resources via its RSVP services 346 and traffic control services 348, as described above, and updates the resource allocation field 940 of the resource grant data structure entry 910a. Next, at Step 1080, intermediate node 200c updates the reservation data structure 810a illustratively by placing the amount of resources allocated for data flow T1 in the entry's resource allocation field 870. At Step 1085, intermediate node 200c forwards the reservation request to the next upstream intermediate node along the path. The sequence ends at Step 1095.

For data flow T2, S2 directs node 110a to generate and forward a path message associated with data flow T2, as described above, wherein the GID set 770 in the path message contains the members {X, Z}. Intermediate nodes 200 acquiring and processing the path message create an entry (e.g., 810b) in their reservation data structures 800 as described above. Eventually, the path message is acquired by node 110b, which notifies receiver R2 of the path message. In response, R2 directs node 110b to generate and issue a reservation request, which is eventually acquired by intermediate node 200b where it is processed as described above. Specifically, at Step 1055, node 200b determines that the GID set indicates that resources may be shared between data flow T1 and data flow T2 because both data flows share a common GID (i.e., X). At Step 1065, intermediate node 200 shares the resources allocated to data flow T1 with data flow T2 by adding the data flow identifier associated with data flow T2 (i.e., T2) to the serving flows field 950 of entry 910a. Since the resources allocated to data flow T1 are greater than the resources needed for data flow T2, intermediate node 200b, at Step 1070, concludes that sufficient resources have been allocated to the new data flow. That is, since the resources allocated to data flow T1 are greater than the resources requested for data flow T2, and since data flow T2 may share resources with data flow T1, the intermediate node 200b concludes that sufficient resources have been allocated for the new data flow T1 and the sequence proceeds to Step 1080. At Step 1080, the intermediate node 200b updates the new data flow's entry 810b, as described above and, at Step 1085, forwards the reservation request message to the next upstream node (e.g., node 200a).

It should be noted that in accordance with the present invention the sharing of resource may be non-transitive with respect to other forms of sharing. For example, assume two flows A and B are created and are allowed to share resources using the RSVP Shared Explicit (SE) method. Further, assume that data flows A and B are associated with different GID values. Now assume that a third flow C is created and that it is associated with the same GID as data flow A. Although data flows A and B may share the same resources, the resources allocated to data flow A may not be shared with data flow C (even though they have the same GID). This is because data flow B is not associated with the same GID as flows A and C; thus, separate resources need to be allocated for data flow C.

For data flow T3, S3 directs node 110a to generate and forward a path message associated with T3, as described above, wherein the GID set contains a value of {Z}. Intermediate nodes 200 acquiring and processing the path message create an entry 810c associated with the new data flow T3 in their reservation data structures 800. Eventually, the path message is acquired by end node 110c, which notifies receiver R3 of the path message. In response, R3 directs node 110c to generate and issue a reservation request message, which is eventually forwarded to intermediate node 200b. At Step 1055, intermediate node 200b determines that the GID set indicates that resources need to be allocated for flow T3 because T3 is not associated with a GID that is common with T1. Since T3 may not share resources with T1, it likewise may not share resources with T2 because T2 is sharing resources with T1 and T3 is not associated with a GID that is common to T1. Thus, the sequence proceeds to Step 1060 where intermediate node 200b generates resource grant data structure entry 910b as described above and Step 1075 where intermediate node 200b allocates resources for data flow T3. The sequence then proceeds to Step 1080 where node 200b updates the data flow's entry 810c, as described above, and Step 1085 where the node 200b forwards the reservation request message to the next upstream node (e.g., node 200a).

Figure 11A:
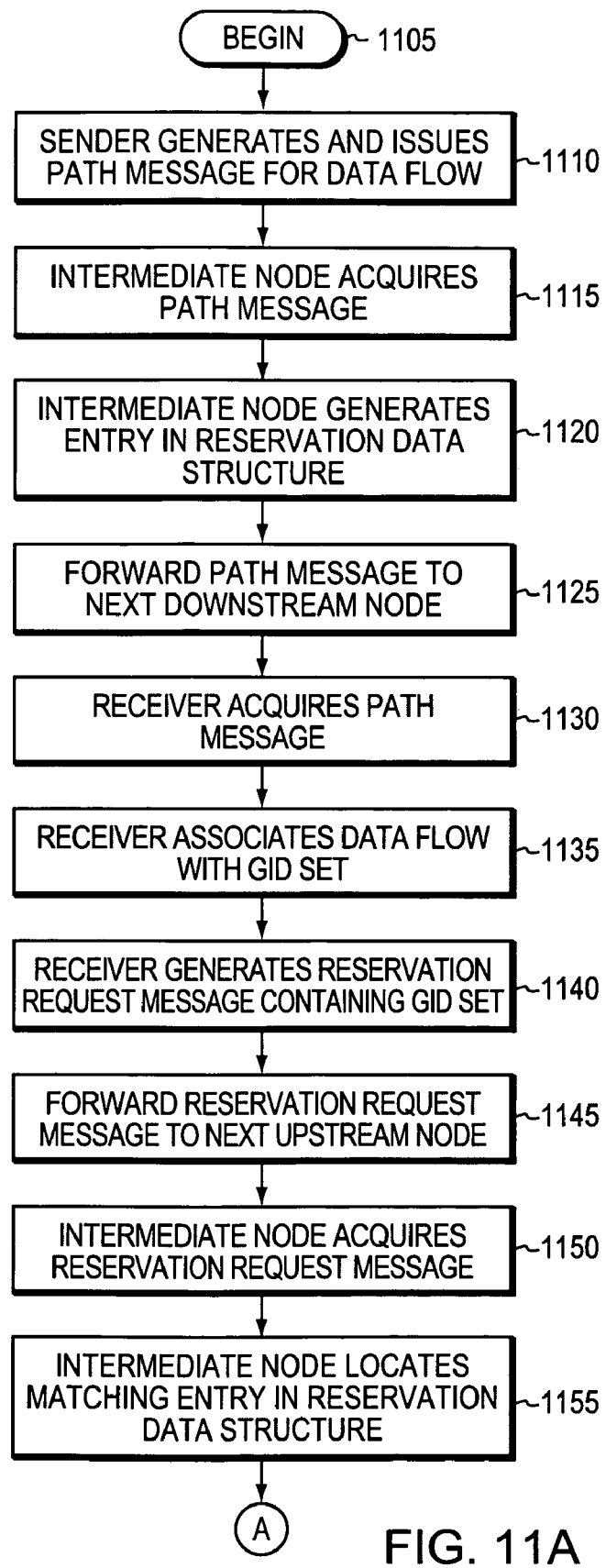
FIGS. 11A-B are flow diagrams of a sequence of steps that may be used to process a reservation request message containing a GID set in accordance with the present invention.
Figure 11B:
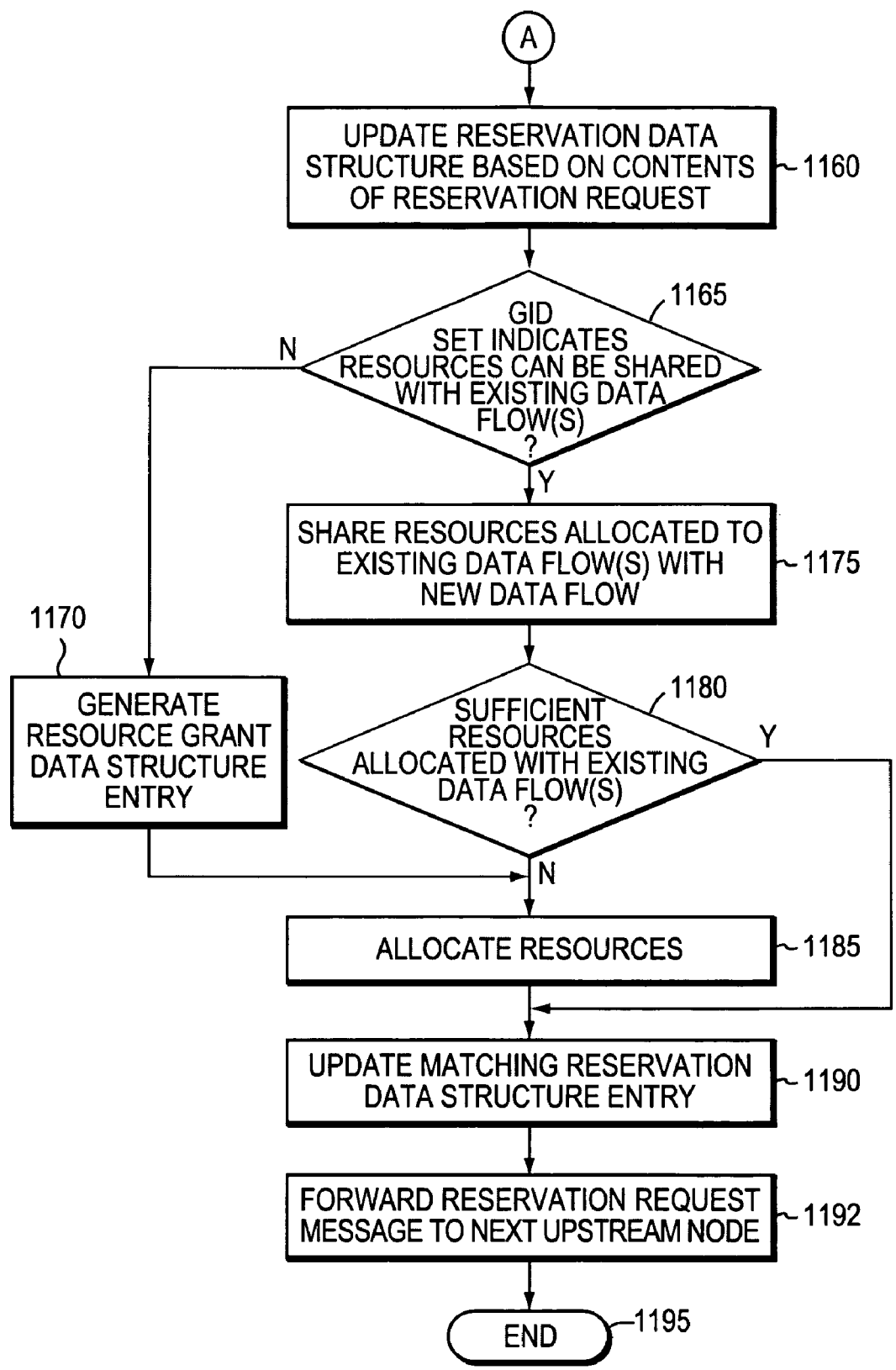

In accordance with the inventive technique, GID sets associated with data flows may be carried in reservation request messages. FIGS. 11A-B are a flow diagram of a sequence of steps that may be used to establish a reservation for a new data flow between a sender and a receiver in accordance with the inventive technique wherein a reservation request message associated with the new data flow contains a GID set for the new data flow. The sequence starts at Step 1105 and proceeds to Step 1110 where the sender generates and issues a path message for the new data flow. Illustratively, the path message is a conventional RSVP Path message 400 generated in accordance with RSVP. Next, at Steps 1115-1125, an intermediate node 200 acquires the path message, generates an entry 810 in its reservation data structure 800 that is associated with the new data flow and forwards the path message to the next downstream node, as described above.

At Step 1130, eventually the receiver acquires the path message and at Step 1135, associates the new data flow with a GID set, as described above. Next, at Step 1140, in response to the path message, the receiver generates a reservation request message containing the GID set. Illustratively, the reservation request message is a RSVP Resv message 500 generated in a conventional manner except that it contains a GID object 700 that holds the GID set associated with the new data flow, as described above. At Step 1145, the reservation request message is then forwarded to the next upstream node.

At Step 1150, an intermediate node 200, on the path between the sender and the receiver, acquires the reservation request message and, at Step 1155, locates a matching entry 810 in its reservation data structure 800 that is associated with the new data flow. At Step 1160 (FIG. 11B), the intermediate node 200 updates the new data flow's reservation data structure illustratively by storing the GID set 770 contained in the reservation request message in the GID set field 890 of the new data flow's entry 810.

At Step 1165, using the new data flow's GID set, the intermediate node 200 determines if resources allocated to the existing data flows can be shared with the new data flow, as described above. If not, the intermediate node 200 concludes that resources cannot be shared with existing data flows and the sequence proceeds to Step 1170 where the intermediate node 200 generates a resource grant data structure entry 910, and Step 1185. Otherwise, the sequence proceeds to Step 1175 where the intermediate node 200 shares resources allocated to one or more existing data flows with the new data flow, as described above.

At Step 1180, the intermediate node 200 determines if the resources allocated to the existing data flows are sufficient to meet the resources requested by the new data flow. If so, the sequence proceeds to Step 1190. Otherwise, the sequence proceeds to Step 1185 where resources are allocated to meet the needs of the new data flow.

At Step 1190, the intermediate node 200 updates the new data flow's entry 810 in the reservation data structure 800, as described above. At Step 1192, the intermediate node forwards the reservation request message to the next upstream node. The sequence ends at Step 1195.

The above-described illustrated embodiment describes the present invention as used in an environment where resources are shared between a new data flow and an existing data flow. It should be noted that the inventive technique may be adapted to operate in an environment where the new data flow shares resources with a plurality of existing data flows.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. In a data network containing one or more data flows, a method for sharing resources allocated to the one or more existing data flows with a new data flow having a source and a destination, the method comprising the steps of:
    acquiring a signaling message for the new data flow having the source and the destination at an intermediate node located between the source and the destination, wherein the signaling message contains one or more group identifiers (GIDs) each having a GID object associated with the new data flow, wherein the GID object includes a set field that indicates a set of one or more GIDs associated with the new data flow, a class field that holds a value that identifies the GID object as belonging to a particular class and a type field that holds a value that indicates a type of object within the class as one of an Internet Protocol (IP) version 4 or IP version 6 type object;
    implementing quality of service functions including a classifier to determine a quality of service class, a packet scheduler to determine packet forwarding and an admission control function to determine resource allocation for the data flows;
    generating an entry for the new data flow in a reservation data structure of the intermediate node;
    assigning a unique reservation identifier to the entry;
    searching the reservation data structure to identify one or more entries whose GID set field contains one or more GIDs that are a subset of the GIDs associated with the new data flow and selecting one or more entries from the identified entries that have resources that may be shared with the new data flow;
    determining if any of the one or more GIDs associated with the new data flow match any of one or more GIDs associated with one or more existing data flows that have a different source and a different destination that the new data flow;
    if a GID of the one or more GIDs associated with the new data flow matches a GID of the one or more GIDs associated with any of the one or more existing data flows, sharing resources already allocated to those of the one or more existing data flows associated with the matching GID with the new data flow; and
    if no GID of the one or more GIDs associated with the new data flow matches a GID of the one or more GIDs associated with any of the one or more existing data flows, allocating other resources to accommodate the new data flow.

2. A method as defined in claim 1 wherein the signaling message is a Resource Reservation Protocol (RSVP) Path message.

3. A method as defined in claim 1 wherein the signaling message is a RSVP Resv message.

4. A method as defined in claim 1 wherein each existing data flow is associated with an entry in a reservation data structure.

5. A method as defined in claim 4 further comprising the steps of:
    allocating an entry in the reservation data structure for the new data flow; and
    storing the one or more GIDs associated with the new data flow in the allocated entry.

6. A method as defined in claim 5 further comprising the steps of:
    locating the new data flow's entry in the reservation data structure;
    comparing the one or more GIDs in the new data flow's entry with GIDs contained in entries associated with one or more existing data flows; and
    if a GID of the one or more GIDs in the new data flow's entry is the same as a GID contained in entries associated with one or more existing data flows, concluding a GID of the one or more GIDs associated with the new data flow matches a GID of the one or more GIDs associated with the one or more existing data flows.

7. A method as defined in claim 4 further comprising the steps of:
    comparing the one or more GIDs associated with the new data flow with one or more GIDs contained in entries in the reservation data structure associated with one or more existing data flows; and
    if a GID of the one or more GIDs associated with the new data flow is the same as a GID contained in entries associated with one or more existing data flows, concluding a GID of the one or more GIDs associated with the new data flow matches a GID of the one or more GIDs associated with the one or more existing data flows.

8. A method as defined in claim 1 further comprising the steps of:
    determining if resources already allocated to those of the one or more existing data flows associated with the matching GID are sufficient to accommodate the new data flow; and
    if not, allocating additional resources, above and beyond those resources already allocated to the one or more existing data flows with the matching GID, such that the total allocated resources are sufficient to accommodate the new data flow.

9. A method as defined in claim 1 wherein the GID is a universally unique identifier.

10. A method as defined in claim 1 further comprising the steps of:
    generating the one or more GIDs associated with the new data flow at a first node of the data network; and
    distributing the one or more generated GIDs associated with the new data flow to one or more second nodes of the data network via a protocol.

11. A method as defined in claim 10 wherein the first node is one of a central server and an end node, and wherein the one or more second nodes are end nodes.

12. A method as defined in claim 1 wherein the resources comprise bandwidth.

13. In a data network containing one or more existing data flows, an intermediate node configured to share resources allocated to one or more existing data flows with a new data flow having a source and a destination, the intermediate node comprising:
 a memory configured to hold a signaling message for the new data flow having the source and the destination, wherein the signaling message contains one or more group identifiers (GIDs) each having a GID object associated with the new data flow, wherein the GID object includes a set field that indicates a set of one or more GIDs associated with the new data flow; and
 a processor configured to access the signaling message contained in the memory and configured to:
  a) generate an entry for the new data flow in a reservation data structure of the memory;
  b) assign a unique reservation identifier to the entry;
  c) search the reservation data structure to identify one or more entries whose GID set field contains one or more GIDs that are a subset of the GIDs associated with the new data flow and select one or more entries from the identified entries that have resources that may be shared with the new data flow, a class field that holds a value that identifies the GID object as belonging to a particular class and a type field that holds a value that indicates a type of object within the class as one of an Internet Protocol (IP) version 4 or IP version 6 type object;
  d) determine if any of the one or more GIDs associated with the new dataflow match any of one or more GIDs associated with one or more existing data flows that have a different source and a different destination than the new data flow,
  e) implementing quality of service functions including a classifier to determine a quality of service class, a packet scheduler to determine packet forwarding and an admission control function to determine resource allocation for the data flows;
  f) if a GID of the one or more GIDs associated with the new data flow matches a GID of the one or more GIDs associated with any of the one or more existing data flows, share resources already allocated to those of the one or more existing data flows associated with the matching GID with the new data flow, and
  g) if no GID of the one or more GIDs associated with the new data flow matches a GID of the one or more GIDs associated with any of the one or more existing data flows, allocate other resources to accommodate the new data flow.

14. An intermediate node as defined in claim 13 further comprising:
 a memory coupled to the processor and configured to hold a reservation data structure comprising one or more entries wherein each existing data flow is associated with an entry in the reservation data structure.

15. An intermediate node as defined in claim 14 wherein the processor is further configured to:
 a) allocate an entry in the reservation data structure for the new data flow, and
 b) store the one or more GIDs associated with the new data flow in the entry allocated for the new data flow.

16. An intermediate node as defined in claim 15 wherein the processor is further configured to:
 a) locate the new data flow's entry in the reservation data structure,
 b) compare one or more GIDs contained in the new data flow's entry with one or more GIDs contained in entries associated with one or more existing data flows, and
 c) conclude a GID of the one or more GIDs associated with the new data flow matches a GID of the one or more GIDs associated with one or more existing data flows, if a GID of the one or more GIDs in the new data flow's entry is the same as a GID contained in entries associated with the one or more existing data flows.

17. An intermediate node as defined in claim 14 wherein the processor is further configured to:
 a) compare the one or more GIDs associated with the new data flow with one or more GIDs contained in entries in the reservation data structure associated with one or more existing data flows; and
 b) conclude a GID of the one or more GIDs associated with the new data flow matches a GID of the one or more GIDs associated with one or more existing data flows, if a GID of the one or more GIDs associated with the new data flow is the same as a GID contained in entries associated with the one or more existing data flows.

18. An intermediate node as defined in claim 13 wherein the processor is further configured to:
 a) determine if resources already allocated to those of the one or more existing data flows associated with the matching GID are sufficient to accommodate the new data flow, and
 b) allocate additional resources to accommodate the new data flow, if the resources already allocated to the one or more existing data flows with the matching GID are not sufficient to accommodate the new data flow.

19. An apparatus for sharing resources for a new data flow having a source and a destination in a data network with resources allocated to one or more existing data flows in the data network, the apparatus comprising:
 a memory unit having a reservation data structure; and
 a processor unit in communication with the memory unit and configured to:
 acquire a signaling message for the new data flow having the source and the destination, wherein the signaling message contains one or more group identifiers (GIDs) each having a GID object associated with the new data flow, wherein the GID object includes a set field that indicates a set of one or more GIDs associated with the new data flow;
 generate an entry for the new data flow in the reservation data structure of the intermediate node;
 assign a unique reservation identifier to the entry;
 search the reservation data structure to identify one or more entries whose GID set field contains one or more GIDs that are a subset of the GIDs associated with the new data flow and selecting one or more entries from the identified entries that have resources that may be shared with the new data flow, a class field that holds a value that identifies the GID object as belonging to a particular class and a type field that holds a value that indicates a type of object within the class as one of an Internet Protocol (IP) version 4 or IP version 6 type object;
 implementing quality of service functions including a classifier to determine a quality of service class, a packet scheduler to determine packet forwarding and an admission control function to determine resource allocation for the data flows;
 determine if any of the one or more GIDs associated with the new data flow match any of one or more GIDs associated with one or more existing data flows that have a different source and a different destination than the new data flow;
share resources with the new data flow that have been already allocated to the one or more existing data flows, in response to a GID of the one or more GIDs associated with the new data flow matching a GID of the one or more GIDs associated with the one or more existing data flows; and
allocate other resources to accommodate the new data flow if no GID of the one or more GIDs associated with the new data flow matches a GID of the one or more GIDs associated with any of the one or more existing data flows.

20. An apparatus as defined in claim 19, wherein the reservation data structure comprises one or more entries, wherein each existing data flow is associated with an entry in the reservation data structure.

21. An apparatus as defined in claim 20, wherein the processor is further configured to:
allocate an entry in a reservation data structure for the new data flow; and
store the one or more GIDs associated with the new data flow in the new data flow's entry.

22. An apparatus as defined in claim 21, wherein the processor is further configured to:
locate the new data flow's entry in the reservation data structure;
compare one or more GIDs in the new data flow's entry with GIDs contained in one or more entries associated with one or more existing data flows; and
conclude a GID of the one or more GIDs associated with the new data flow matches a GID of the one or more GIDs associated with one or more existing data flows, if a GID of the one or more GIDs in the new data flow's entry is the same as a GID of the one or more GIDs contained in entries associated with one or more existing data flows.

23. A non-transitory computer readable medium comprising computer executable instructions for:
acquiring a signaling message for a new data flow having a source and a destination in a data network, wherein the signaling message contains one or more group identifiers (GIDs) each having a GID object associated with the new data flow, wherein the GID object includes a set field that indicates a set of one or more GIDs associated with the new data flow;
generating an entry for the new data flow in the reservation data structure of the intermediate node;
assigning a unique reservation identifier to the entry;
searching the reservation data structure to identify one or more entries whose GID set field contains one or more GIDs that are a subset of the GIDs associated with the new data flow and selecting one or more entries from the identified entries that have resources that may be shared with the new data flow, a class field that holds a value that identifies the GID object as belonging to a particular class and a type field that holds a value that indicates a type of object within the class as one of an Internet Protocol (IP) version 4 or IP version 6 type object;
implementing quality of service functions including a classifier to determine a quality of service class, a packet scheduler to determine packet forwarding and an admission control function to determine resource allocation for the data flows;
determining if any of one or more group identifiers (GIDs) contained in an acquired signaling message for a new data flow having a source and a destination match any of one or more GIDs associated with one or more existing data flows that have at least one of a different source and a different destination than the new data flow;
sharing resources with the new data flow that have been already allocated to the one or more existing data flows, in response to a GID of the one or more GIDs associated with the new data flow matching a GID of the one or more GIDs associated with the one or more existing data flows; and
allocating other resources to accommodate the new data flow if no GID of the one or more GIDs associated with the new data flow matches a GID of the one or more GIDs associated with any of the one or more existing data flows.

24. A method comprising:
acquiring a reservation request message for a new data flow having a source and a destination in a network, at an intermediate node located in the network between the source and the destination, the new data flow assigned a set of one or more group identifiers (GIDs), wherein the reservation request message requests a unique reservation identifier to be assigned to the entries associated with the new data flow;
determining, at the intermediate node, whether bandwidth previously allocated to one or more existing data flows may be shared with the new data flow by comparing the set of one or more GIDs assigned to the new data flow to a set of one or more GIDs assigned to each of the one or more existing data flows by identifying one or more entries whose GID set field contains one or more GIDs that are a subset of GIDs associated with the new data flow and selecting one or more entries from the identified entries that have resources that may be shared with the new data flow, a class field that holds a value that identifies the GID object as belonging to a particular class and a type field that holds a value that indicates a type of object within the class as one of an Internet Protocol (IP) version 4 or IP version 6 type object, wherein at least one of the one or more existing data flows has a different source and a different destination than the source and the destination of the new data flow;
implementing quality of service functions including a classifier to determine a quality of service class, a packet scheduler to determine packet forwarding and an admission control function to determine resource allocation for the data flows;
if a GID of the set of GIDs assigned to the new data flow matches a GID of the set of GIDs assigned to any of the one or more existing data flows, sharing bandwidth that was previously allocated to those of the one or more existing data flows assigned the matching GID with the new data flow; and
if no GID of the set of GIDs assigned to the new data flow matches a GID of the set of GIDs assigned to any of the one or more existing data flows, not sharing bandwidth that was previously allocated to any of the one or more existing data flows with the new data flow, and instead allocating other bandwidth to accommodate the new data flow.

25. A method as defined in claim 24 wherein the reservation request message is a Resource Reservation Protocol (RSVP) Resv message.

26. A method as defined in claim 24 wherein each existing data flow is associated with an entry in a reservation data structure, the method further comprising:

allocating an entry in the reservation data structure for the new data flow; and storing the set of one or more GIDs assigned to the new data flow in the allocated entry.

27. A method as defined in claim 26 wherein the comparing compares the set of one or more GIDs in the new data flow's entry with the set of one or more GIDs contained in entries associated with the one or more existing data flows.

28. A method as defined in claim 24 wherein the sharing further comprises:

determining if bandwidth that was previously allocated to those of the one or more existing data flows assigned the matching GID is sufficient to accommodate the new data flow;

if the bandwidth that was previously allocated to those of the one or more existing data flows assigned the matching GID is sufficient to accommodate the new data flow, only sharing the bandwidth that was previously allocated to those of the one or more existing data flows those of the with the new data flow; and if not, allocating additional bandwidth, above and beyond the bandwidth previously allocated to those of the one or more existing data flows assigned the matching GID, such that the total allocated bandwidth is sufficient to accommodate the new data flow.

29. A method as defined in claim 24 wherein the GID assigned to the new data flow was generated by a central server separate from the source and the destination of the new data flow.

\* \* \* \* \*